Figure 1:
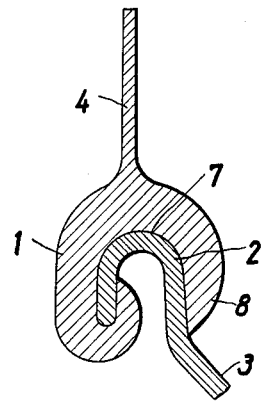

Nov. 9, 1965   R. FRITZMEIER   3,216,029
FLEXIBLE HANGING-IN STRIP ON AN UPHOLSTERY
COVER, PARTICULARLY OF A
VEHICLE SEAT
Filed Sept. 5, 1963

Inventor:
RUPERT FRITZMEIER 3,216,029
FLEXIBLE HANGING-IN STRIP ON AN UPHOLSTERY COVER, PARTICULARLY OF A VEHICLE SEAT
Rupert Fritzmeier, % Georg Fritzmeier, Grosshelfendorf uber Munich, Germany
Filed Sept. 5, 1963, Ser. No. 306,731
Claims priority, application Germany, Sept. 8, 1962, F 37,777
3 Claims. (Cl. 5—353.1)

The present invention relates to a hook-shaped, profiled, flexible hanging-in strip (welt) on an upholstery cover, particularly of a vehicle seat.

Such strips which consist generally of plastic material, e.g. polyvinyl chloride and which are sewn, glued or welded to the cover rim, serve to fasten the cover on the frame of the upholstery, in the case of vehicles seats on the seat mold. For this purpose the rim of the frame, e.g. of the seat mold is configurated as a groove opening downward into which the strip is hanged in tensioning the cover. If now the cover tension gradually decreases or if it is provisionally eliminated by other forces, e.g. by charging the seat, it may happen that the hook-shaped connection between welt and groove releases itself automatically, all the more as in the lateral part of the cover also forces arise, which are directed downward. This is the reason why up to now the upholstery had to be kept flat, so that the tension in the cover is maintained even after the seat is loaded. High upholsteries could not be used.

The present invention eliminates these drawbacks. For this purpose an embodiment is proposed which is characterized by the fact that the part above the hook mouth of the hanging-in strip is configurated in a saddle shaped manner.

A lip extends preferably from the saddle portion on the open side of the hook profile, which lip extends preferably till under the hook mouth.

Figure 2:
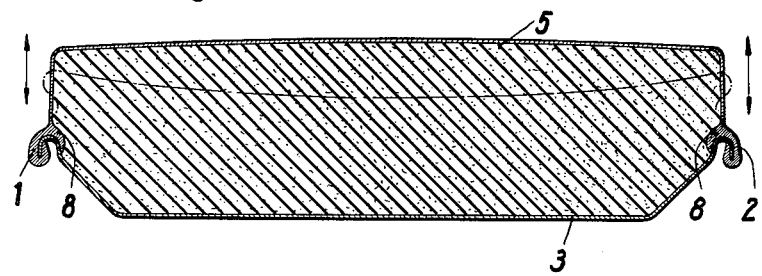
Figure 3:
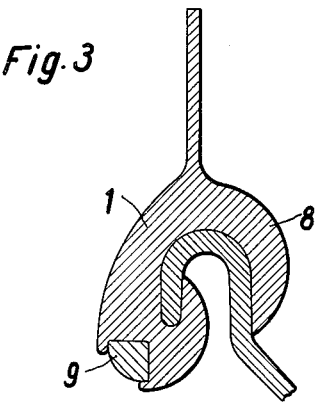

The drawing shows embodiments of the invention:

FIG. 1 is a transverse section through the hanging-in strip with the rim groove of the seat mold at an enlarged scale, FIG. 2 shows a section through the upholstery seat, and FIG. 3 shows a further embodiment of the hanging-in strip.

As shown in the drawing the hanging-in strip 1 has a hook-shaped profile, by means of which it is hanged into the groove 2 of the seat mold 3. Its web 4 is welded to the cover 5 which may likewise consist of thermoplastic material, e.g. polyvinyl chloride. Above the hook mouth of the strip 1 lying at the level of the hook point 6 there is provided a saddle 7 which serves to avoid that the hanging-in strip 1 disengages from the groove 2 when the tension in the cover 5 decreases.

This safety is further improved by a lip 8 extending from the saddle 7 on the inner side of the hook and till under the mouth of the rim strip 1. It forms together with the strip 1 a clamp embracing the groove 2.

The hanging-in strip 1, the lip 8 and the web 4 represent together one single extruded piece of elastic plastic material. The complete strip can thus be disengaged from the groove by hand.

The embodiment according to FIGURE 3 is different from the described design merely by the fact that the hanging-in strip 1 is provided with a reinforcement insert 9.

I claim:
1. A resilient retaining strip secured to the skirt of a seat cover and for securing the seat cover to a cushion supporting member having a peripheral portion terminating in a generally hook-shaped configuration, said strip being primarily of longitudinal configuration and having a cross section of generally saddle-shaped configuration, one leg of said saddle being provided with a hook-shaped portion for engagement with said hook-shaped peripheral portion of said cushion supporting member to retain said strip in engagement with said supporting member when an upward force is exerted on said strip, and the other leg of said saddle being provided with a lip portion for engagement with the neck of said hook-shaped peripheral portion of said cushion supporting member, said saddle legs cooperatively straddling said hook-shaped peripheral portion of said supporting member and maintaining said strip in engagement with said cushion supporting member when a downward force is exerted on said strip by preventing said strip from sliding off either side of said hook-shaped peripheral portion of said supporting member.

2. A resilient seat cover retaining strip for securing said cover to a cushion supporting member terminating in an outwardly extending hook-like peripheral portion, comprising a web portion for engagement with said seat cover and a generally longitudinally-shaped body portion of generally saddle-shaped cross-section configuration, the undersurface of said saddle-shaped body portion being adapted for engagement with the top surface of said hook-like peripheral portion of said supporting member such that each leg of said saddle extends downwardly on each side of said hook-like portion to maintain said strip in engagement with said supporting member at such time a downward force is transmitted to said strip from said cover through said web, one leg of said saddle-shaped body portion being curved under and provided with a longitudinally extending slot therein for the reception of the end of said hook-like portion of said supporting member such that said strip is held in engagement with said supporting member at such time an upward force is transmitted to said strip from said cover through said web.

3. A retaining strip according to claim 2 wherein said strip is also provided with a reinforcing insert extending longitudinally of said strip and being in contact with said one leg of said saddle-shaped body portion.

References Cited by the Examiner

UNITED STATES PATENTS

| 1,969,958 | 8/34 | Alder | 4—185 |
| 2,017,178 | 10/35 | Brankhof | 5—353.1 |
| 2,760,562 | 8/56 | Fisher | 5—353.1 |
| 3,096,601 | 7/63 | Biaband | 5—353.5 |
| 3,102,755 | 9/63 | Wilfert | 5—353.2 |

FOREIGN PATENTS

| 1,201,822 | 1/60 | France. |
| 839,143 | 6/60 | Great Britain. |

FRANK B. SHERRY, *Primary Examiner.*